(12) United States Patent
Ethier

(10) Patent No.: US 6,622,466 B1
(45) Date of Patent: Sep. 23, 2003

(54) APPARATUS FOR LANDSCAPING AROUND OBSTACLES

(76) Inventor: Albert Ethier, 143 Cardinal Crescent, Saskatoon, Saskatchewan, S7L 6H5 (CA)

( * ) Notice: Subject to any disclaimer, the term of this patent is extended or adjusted under 35 U.S.C. 154(b) by 0 days.

(21) Appl. No.: 09/940,331

(22) Filed: Aug. 27, 2001

(51) Int. Cl.$^7$ .......................... A01B 73/00; A01B 39/16
(52) U.S. Cl. ......................................... 56/228; 172/24
(58) Field of Search .................. 56/1, 14.7, 14.9, 56/15.1, 16.7, 233, 228; 172/23, 24, 25, 26, 98, 99

(56) References Cited

U.S. PATENT DOCUMENTS

| | | | |
|---|---|---|---|
| 509,544 A | * 11/1893 | Moler | 172/24 |
| 720,113 A | * 2/1903 | Collins | 172/24 |
| 1,364,825 A | * 1/1921 | Anderson | 172/24 |
| 2,651,249 A | 9/1953 | Morkoski | |
| 3,241,302 A | 3/1966 | Barry | |
| 3,487,614 A | * 1/1970 | Uhor | 56/233 |
| 3,552,106 A | * 1/1971 | Baxter | 56/328.1 |
| 4,689,940 A | * 9/1987 | Skovhoj | 172/24 |
| 4,777,787 A | * 10/1988 | Warren | 47/4 |
| 4,901,508 A | * 2/1990 | Whatley | 56/10.4 |
| 5,184,685 A | * 2/1993 | Meyer | 111/133 |
| 5,642,677 A | * 7/1997 | Meyer | 111/118 |
| 5,704,201 A | * 1/1998 | Van Vleet | 56/14.9 |
| 6,330,911 B1 | * 12/2001 | Allen et al. | 166/379 |

FOREIGN PATENT DOCUMENTS

| CA | 1318168 | 5/1995 |
|---|---|---|

* cited by examiner

*Primary Examiner*—Thomas B. Will
*Assistant Examiner*—Nathan Mammer
(74) *Attorney, Agent, or Firm*—Haugen Law Firm PLLP (57) ABSTRACT

An apparatus suitable for using a landscape tool around an obstacle in association with a driver. The apparatus comprises: a frame adapted to operatively connect the apparatus to a transport device, a traveler, an open-centered support having a gap therein, the support being secured to the frame and being adapted to slidably engage the traveler; an engager adapted to operatively connect the traveler to a driver permitting the driver to cause the traveler to slide along the support, and a laterally adjustable tool attachment bracket secured to the traveler and adapted to receive the landscape tool. In operation, the apparatus is presented to the obstacle such that the obstacle passes through the gap into the open center of the support, whereupon the engager engages the driver and the traveler slides along the support, such that the tool moves around the obstacle.

22 Claims, 6 Drawing Sheets

APPARATUS FOR LANDSCAPING AROUND OBSTACLES

FIELD OF THE INVENTION

The invention relates to the field of apparatus suitable for use with a landscape tool for landscaping around an article, such as a tree, post or rock.

BACKGROUND OF THE INVENTION

It is frequently desired to landscape around articles, such as by tilling the ground, or mowing the grass around trees, lamp posts or the like. However, many landscape tools are affixed to large transport devices such as tractors or BOB-CAT utility vehicles. These transport devices are frequently difficult to maneuver around such common obstacles, and such maneuvers can be time consuming and may involve some risk to the operator, such as by tipping of the transport device when driven on an incline. Thus, it is desirable to have a means for using a landscape tool around an obstacle in circumstances where the landscape tool is secured to a transport device. Such an apparatus would be particularly useful for the landscaping of highway shoulders and other regions where speed and efficiency are important.

Various methods and devices for landscaping around obstacles have been proposed in the prior art. However, none entirely overcomes the difficulties associated with the need to use a range of landscape tools in all areas around the perimeter of obstacles having varying shapes and sizes.

Canadian Patent No. 1,318,168 of Cameron ("Cameron") discloses a spinning vertical pillar device adapted to mount on the belly of attractor. This device may be extended laterally from the tractor in a substantially straight line at right angles to the direction of movement of the tractor. However, this device does not provide a ready means of landscaping the area directly opposite the obstacle from the tractor. Moreover, to landscape close to the obstacle, it may be necessary to carefully adjust the tractor position on several occasions, as the tool is advanced around different regions of the obstacle perimeter.

U.S. Pat. No. 2,651,249 of Morkoski ("Morkoski") discloses a mobile orchard cultivator adapted for cultivating the ground areas to the trunks of trees. Morkoski teaches the use of a "C"-shaped broken ring of fixed internal and external diameter, with tines extending radially outwards therefrom. The apparatus is advanced until the obstacle is located within the interior of the "C" portion of the device, and the device is then rotated about the obstacle. This device does not provide for the independent drive of the landscape tool. Thus, such a system may be unsuitable for use with some landscape tools, such as mower blades which must move rapidly in order to be effective. Moreover, the ability of this device to permit landscaping close to an obstacle is limited by the fixed internal diameter of the apparatus. In particular, where an obstacle is substantially smaller than the interior diameter of the "C" rotating portion of the apparatus, the ground immediately adjacent to the obstacle may not be landscaped. In addition, where obstacles are larger than the interior diameter of the apparatus, or are not substantially circular, this apparatus may prove unsuitable for use in landscaping around them.

U.S. Pat. No. 3,241,302 of Barry ("Barry") discloses a mowing apparatus adapted for use around posts and the like. This apparatus includes a substantially "C"-shaped tool carrying unit, on which independently powered mowers may be mounted. The apparatus as a whole is mounted to the side of a tractor, and initially the open side of the "C" is positioned oriented in the direction of movement of the tractor. As the tractor is advanced, an obstacle enters the interior portion of the "C". The apparatus is then engaged as the tractor moves forward, such that the apparatus rotates approximately 180° around the obstacle while the tractor moves in a forward direction. This apparatus may prove unsuitable in many situations where it is difficult to accurately regulate the forward movement of the tractor, as the rotation of the apparatus may depend, to some extent, upon the application of force by the obstacle on the apparatus. Additionally, this apparatus may prove unsuitable for use with large obstacles the diameter of which exceeds the total interior diameter available in the apparatus.

U.S. Pat. No. 5,704,201 of Van Vleet ("Van Vleet") discloses an implement carrier for mounting implements such as mower blades or tiller blades including a deck which is pivotable about a pivot axis suitable for use in pivoting the implement about an obstacle. The pivotable deck of Van Vleet comprises a substantially circular solid deck, with an open wedge cut into it. The apparatus is presented to the obstacle such that the obstacle enters the wedge-shaped slot in the deck, and the deck may be rotated about the obstacle. This apparatus may suffer from many of the weaknesses previously identified in the apparatus of Morkoski and Barry. In particular, this apparatus may prove unsuitable for use with large obstacles whose diameter exceeds the diameter of the slot in the deck at the center of rotation. Additionally, this apparatus may prove unsuitable for use in landscaping immediately adjacent to irregularly shaped obstacles or obstacles of varying sizes, as the location of the implements relative to the center of rotation appear fixed.

It is thus an object of the invention to provide an improved apparatus for landscaping around obstacles.

SUMMARY OF THE INVENTION

In an embodiment of the invention there is provided an apparatus suitable for using a landscape tool around an obstacle. The apparatus comprises a frame adapted to operatively connect the apparatus to a transport device, a traveler, an open-centered support having a gap therein, an engager, and a laterally adjustable tool attachment bracket. The open-centered support is secured to the frame and is adapted to slidably engage as a traveler. The engager is adapted to operatively connect the traveler to a driver, permitting the driver to cause the traveler to slide along a support. The laterally adjustable tool attachment bracket is secured to the traveler and is adapted to receive the landscape tool. In operation, the apparatus is presented to the obstacle such that the obstacle passes through the gap into the open-centered of the support, whereupon the engager engages the driver and the traveler slides along its support, such that the tool moves around the obstacle.

In an embodiment of the invention there is provided a method of using a landscape tool around an obstacle. The method comprises the steps of obtaining an apparatus, securing the tool to the bracket, presenting the apparatus to the obstacle, activating the driver, and operatively connecting the traveler to the driver. The apparatus obtained comprises a frame, a traveler, an open-centered support, an engager, and a laterally adjustable tool attachment bracket. The frame is adapted to operatively connect the apparatus to a transport device. The open-centered support is adapted to slidably engage the traveler. The engager is adapted to operatively connect the traveler to a driver permitting the driver to cause the traveler to slide along its support. The laterally adjustable tool attachment bracket is secured to the traveler and to the tool. The apparatus is presented to the obstacle such that the obstacle passes through the gap in the open-centered of the support and the tool is in the desired position. The traveler is operatively connected to the driver and thereby causing the traveler to slide along the support.

BRIEF DESCRIPTION OF THE FIGURES

These and other advantages of the invention will become apparent upon reading the following detailed description and upon referring to the drawings in which.

While the invention will be described in conjunction with illustrated embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE PREFERRED EMBODIMENTS

In the following description, similar features in the drawings have been given similar reference numerals.

Figure 1:
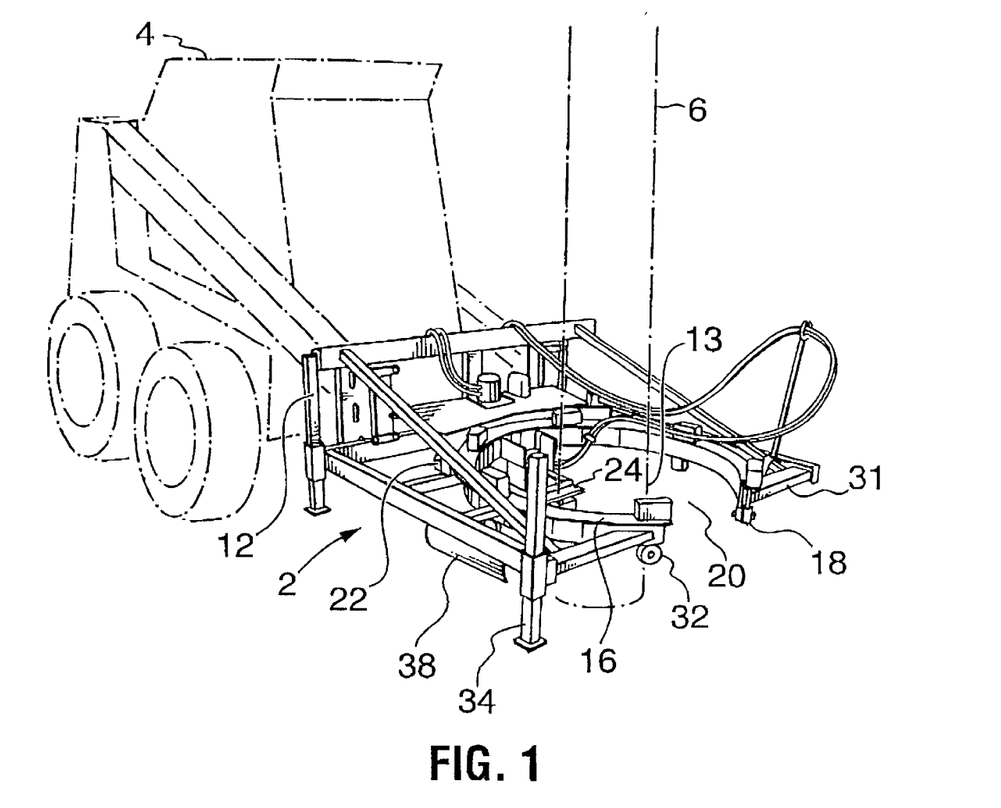
FIG. 1 is a perspective in situ view of an embodiment of the apparatus attached to a transport device and positioned around an obstacle.
Figure 2:
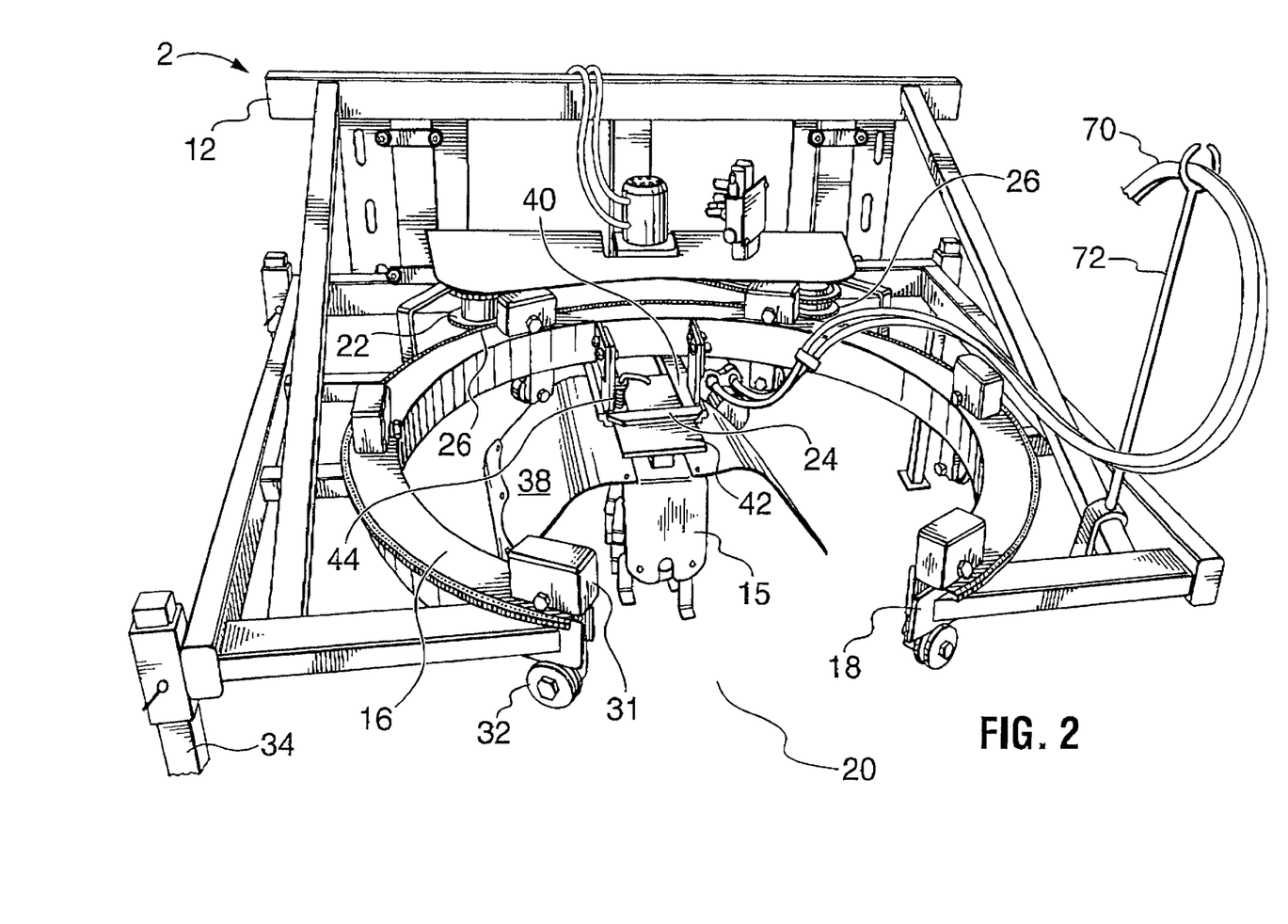
FIG. 2 is a front perspective view of an embodiment of the apparatus.

FIG. 1 depicts an embodiment of the apparatus 2 of the present invention shown secured to a transport device 4 (shown as a BOBCAT, in phantom) and in place around an obstacle 6, (shown as a post, in phantom). FIG. 2 depicts the embodiment of FIG. 1 in greater detail.

The apparatus 2 comprises a frame 12, a support 18 having a gap 20, a traveler 16, an engager 22, a bracket 24, top wheels 31 and bottom wheels 32, legs 34 and a guard 38. The apparatus 2 is shown in association with a tool 15 mounted on the bracket 24. The tool 15 is powered independent oft he traveler 16, by tool hydraulic lines 70 held above the traveler 16 by rods 72. The bracket has a base 40, a receiver 42 and adjustment means 44 (shown in FIG. 2).

The support may further include a gate 36 (not shown), hingedly connected to an end of the support 18, and adapted to swing in and fill the gap 20. The gate 36 is preferably the same length as the gap 20 and is adapted to permit free movement of the traveler 16 across the gate 36 and between the support 18 and the gate 36.

Figure 3:
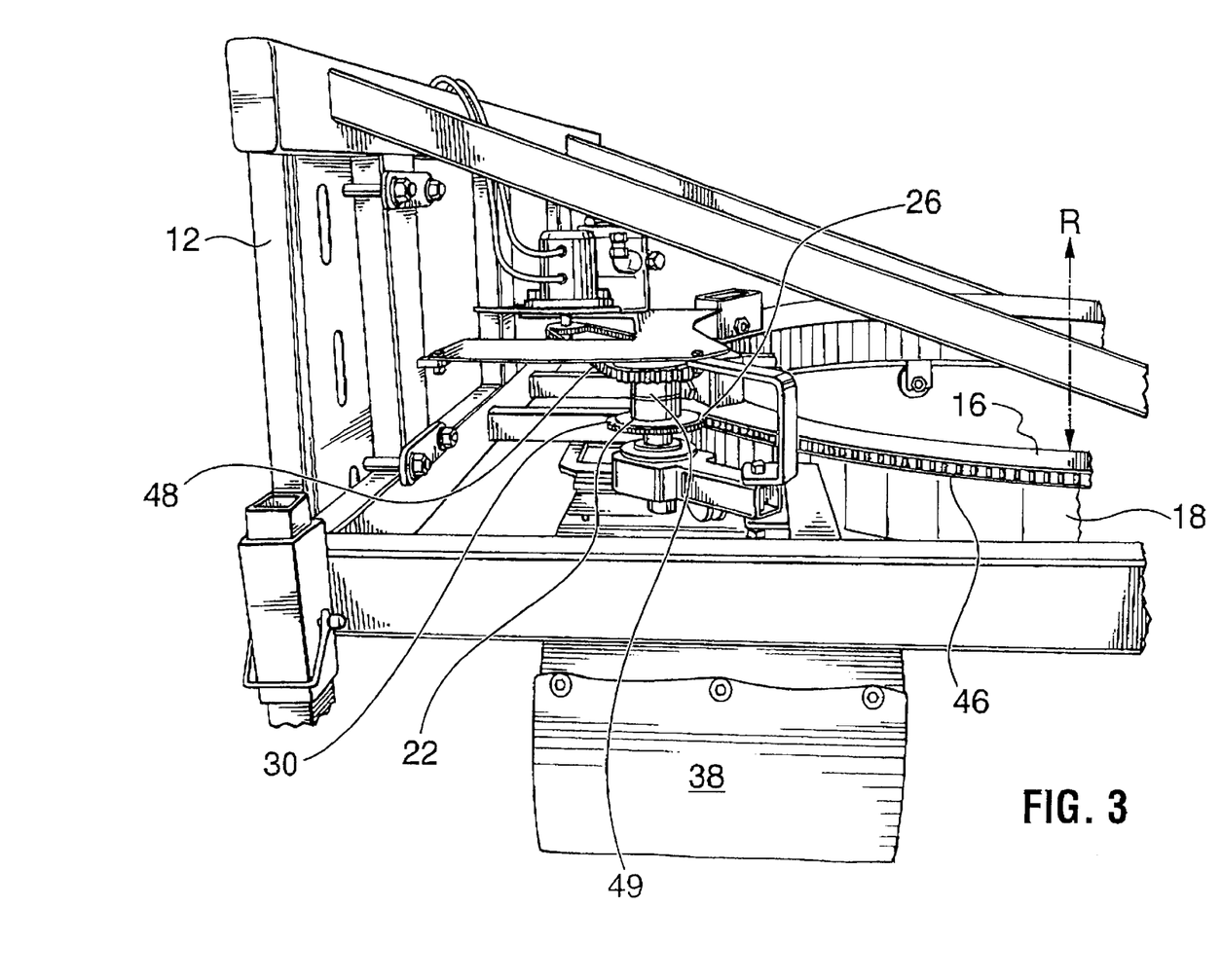
FIG. 3 is a side view of an embodiment of the apparatus.

FIG. 3 depicts a side view of an embodiment of the apparatus 2 of the present invention, showing the engager 22 in greater detail. The engager 22 comprises a driven gear 30 adapted to engage points 26 on a toothed edge 46 of the traveler 16. The engager 22 further comprises a chain 48 which engages a shaft 49 which engages the gear 30 and is operatively connected to a driver 50 (not shown). Thus, rotation of the chain 48 causes corresponding rotation of the gear 30, which engages the edge 46 of the traveler 16, causing rotation of the traveler 16 about an axis of rotation R of the traveler 16.

Figure 4A:
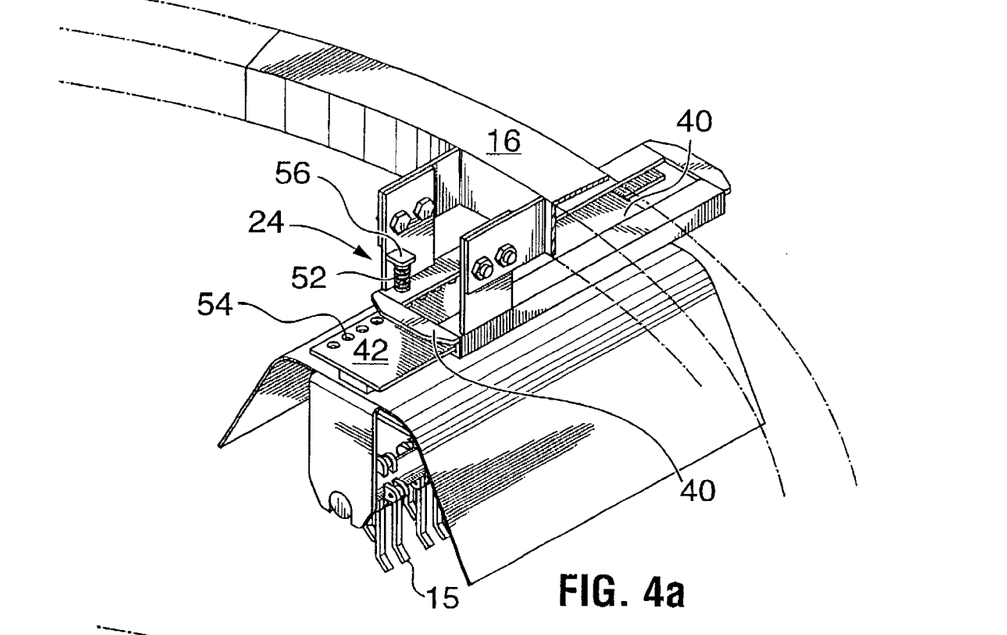
FIG. 4a is a detailed view of an embodiment of the tool attachment having a manual adjustment mechanism.
Figure 4B:
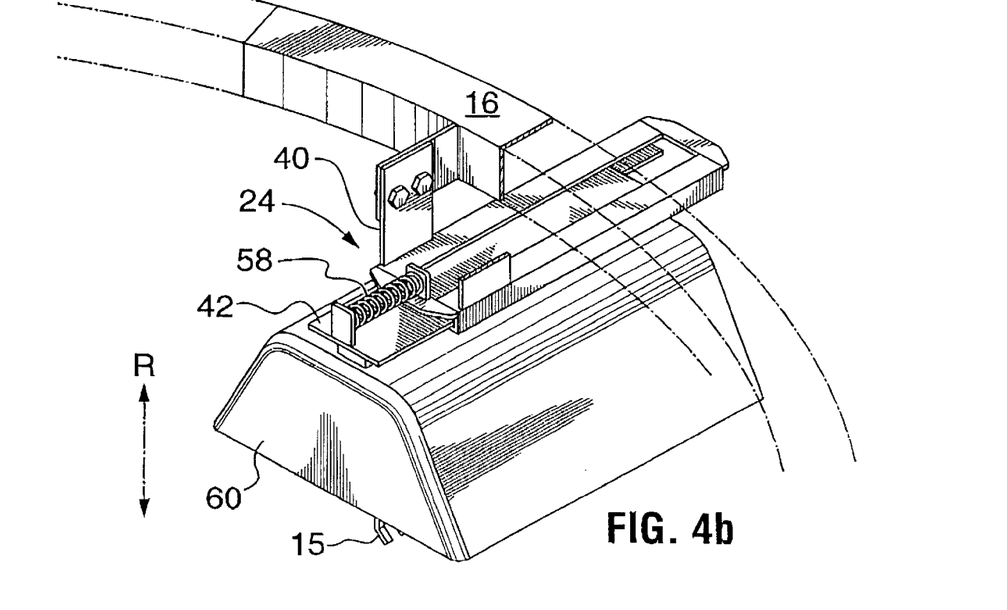
FIG. 4b is a detailed view of an embodiment of the tool attachment having a biased adjustment mechanism.
Figure 4C:
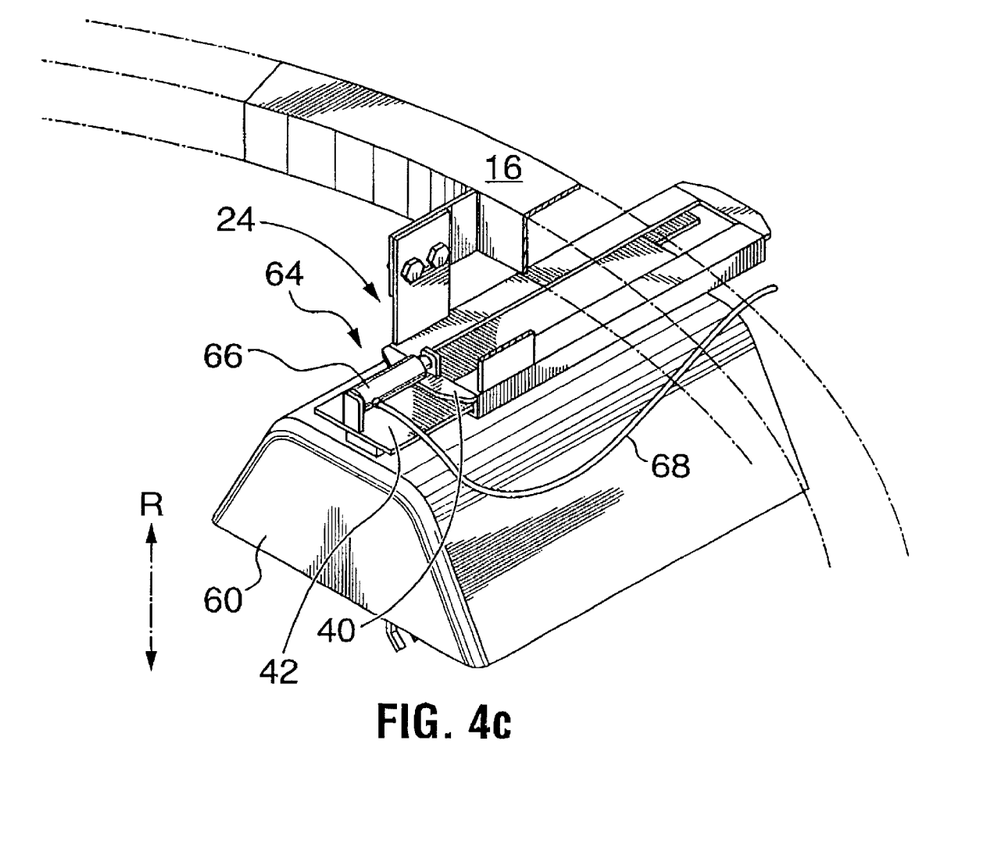
FIG. 4c is a detailed view of an embodiment of the tool attachment having a hydraulic control mechanism.

FIGS. 4a through 4c depict various embodiments of the bracket 24 of the present invention. FIG. 4a depicts a bracket 24 having a manual adjustment mechanism 52. The manual adjustment mechanism 52 comprises a securor, such as a peg 56 passing through the base 40 and adapted to engage one of a plurality of holes 54 in the receiver 42. In operation, the receiver 42 slidably engages the base 40, permitting movement of the tool 15, also secured to the receiver 42, laterally within the apparatus 2, towards or away from the axis of rotation R. When the tool 15 is in the desired location, further sliding of the receiver 42 within the base 40 is prevented by depressing the peg 56 so that it enters one of the holes 54, thereby engaging the receiver 42 and preventing its further movement. A collet pin or the like could similarly be employed to releasably lock the receiver 42 relative to the base 40, thus securing the tool 15 in the desired position.

FIG. 4b depicts an alternate embodiment of bracket 24 for securing the tool 15 in a desired location, through the use of a biased adjustment mechanism, comprising a biasing means, such as a spring 58 and a contractor 60 operatively connected to the receiver 42 and urges the receiver 42 away from the traveler 16 and towards the axis of rotation R. In operation with this embodiment, the apparatus 2 is advanced towards an obstacle 6 until the contactor 60 engages the surface of the obstacle 6. When this occurs, the obstacle 6 applies a force to the contactor 60 which is counter to the force applied by the spring 58, and urges the receiver 42 towards the traveler 16 and away from the axis of rotation R. In this manner, the tool 15 is positioned closely adjacent to the obstacle 6, as the traveler 16 moves around the perimeter 13 of the obstacle 6. It will be appreciated that, depending on the shape of the obstacle 6 and its size, it may be desired to advance the apparatus 2 to a greater or lesser degree following contact of the contactor 60 with the obstacle 6, so as to facilitate effective and constant contact between the contactor 60 and the obstacle 6, as the tool 15 moves around the perimeter 13 of the obstacle 6. Thus, the biased adjustment mechanism 62 permits rotation ot the tool 15 around the obstacle 6.

FIG. 4c depicts a further alternate embodiment of the bracket 24 for positioning the tool 15, through the use of a hydraulic adjustment mechanism 64 comprising a hydraulic controller, such as a hydraulic cylinder 66 and an adjuster hydraulic line 68. In operation, the tool 15 secured to the receiver 42 may be adjusted towards or away from the axis of rotation R by a change in pressure in the hydraulic cylinder 66 communicated by way of the adjuster hydraulic line 68. In particular, when pressure is applied to the hydraulic cylinder 66, the cylinder expands, urging the receiver 42 towards the axis of rotation R. When pressure within the hydraulic cylinder 66 is reduced, the cylinder contracts, causing the receiver 42 to move away from the position of the tool 15 relative to the axis of rotation R, thereby facilitating use of the tool 15 closely adjacent to the perimeter 13 of the obstacle 6, without the need for actual contact between the apparatus 2 or the tool 15 and the obstacle 6. In addition, the position of the tool 15 may be adjusted at different times during the rotation of traveler 16 around the obstacle 6.

Figure 5A:
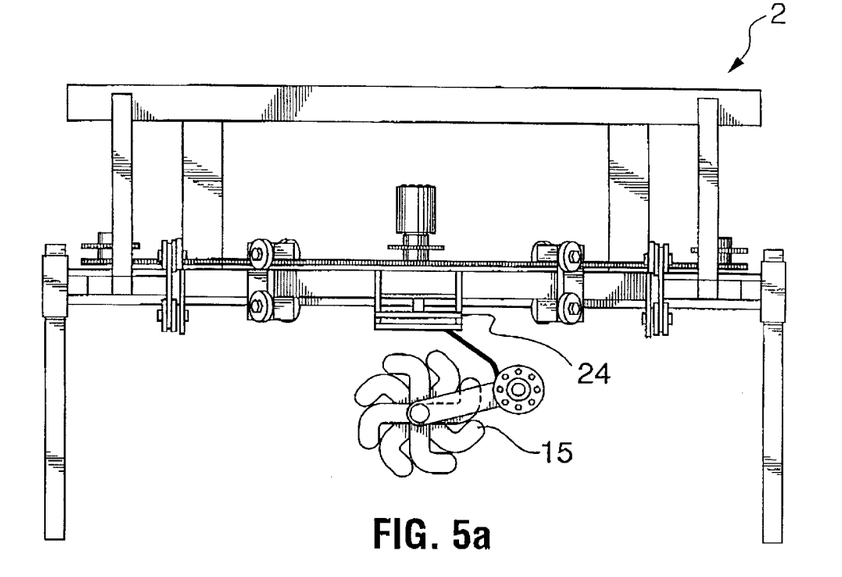
FIG. 5a is a view of an embodiment of the tool attachment adapted to permit lateral pivoting of a tool.
Figure 5B:
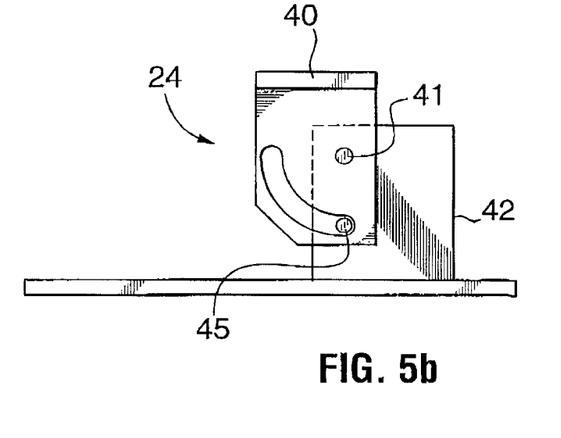
FIG. 5b is a detail view of a portion of the tool attachment of FIG. 5a oriented to hold the tool in a substantially horizontal position.
Figure 5C:
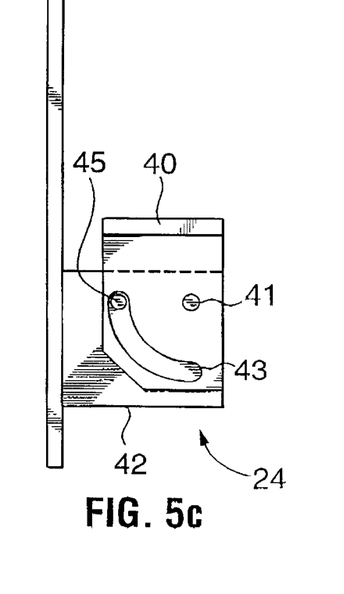
FIG. 5c is a detail view of the portion of the tool attachment of FIG. 5b oriented to hold the tool in a substantially vertical position.

FIG. 5a depicts a portion of an embodiment of the apparatus of the present invention including an embodiment of the bracket 24 adapted to permit pivoting of the tool 15 between horizontal and vertical orientations. FIGS. 5b and 5c depict in greater detail a portion of the embodiment of the bracket 24 shown in FIG. 5a, adapted to permit attachment of the tool 15 to the bracket 24 in a substantially horizontal or vertical position (respectively). This embodiment of the bracket 24 includes a base 40 having a pivot point 41 and a slot 43. The bracket 24 depicted in FIGS. 5b and 5c further include a receiver 42 having a pin 45 adapted to releasably engage the slot 43. The receiver 42 is adapted to pivotally engage the base 40. In operation, the receiver 42 pivots at least partially around the base 40 by rotation around the pivot point 41. The receiver 40 may preferably be held at a desired angle relative to the base 40 through engagement of the pin 45 with the edge of the slot 43, or other suitable means which will be apparent to those skilled in the art.

In operation, the apparatus 2 is presented to the obstacle 6 such that the obstacle 6 passes through the gap 20 into the open-centered of the support 18, and is preferably positioned at or near the axis of rotation R. The engager 22 then operatively connects the traveler 16 to the driver 50, permitting rotation of the traveler 16 about the support 18. As the traveler 16 slides along the support 18, a tool 15 mounted to the bracket 24 is moved around the perimeter 13 of the obstacle 6.

Preferably the engager 22 operatively engages the traveler 16 at least two points 26 (shown on FIGS. 2 and 3) two of which points are separated by a distance at least equal to the difference between the length of the support and the length of the traveler. In particular, the traveler 16 is preferably no longer than the support 18. If it is desired for the traveler 16 to have full 360° rotational capacity, it is desirable that the traveler 16 operatively engage the engager 22 at two points which are sufficiently far apart to ensure that, regardless of the position of the traveler 16 relative to the support 18, at least one of these points 26 will engage the traveler 16 at all times.

The traveler preferably includes top wheels 31 and bottom wheels 32 secured to the top and the bottom of the traveler, as depicted in FIGS. 1, 2 and 3. Wheels 32 facilitate movement of the traveler 16 along the support 18. The support 18 preferably includes parking legs 34 which may be raised or lowered. Thus, when the apparatus 2 is in use, legs 34 could be raised or removed, but when the apparatus 2 is not in use the leg 34 could be lowered to provide independent stability to the apparatus 2 thereby facilitating storage of the apparatus 2 apart from the transport device 14.

The traveler 16 is preferably formed from a durable rigid material, such as steel. However, other sufficiently strong and rigid materials are also contemplated. The support is preferably penannular, such that the obstacle 6 enters the gap 20 and may be positioned at the axis of rotation R within the penannular structure of the support 18. However, the suport 18 may be of varying shapes, depending on the variety of obstacle 6 with which it is to be used. In general, it is preferable to have a support 18 which has a generally circular, or part-circular shape. However, where corresponding adjustments are made to the traveler 16, non-circular shapes are also contemplated.

The apparatus is adapted for use with a driver 50. The driver is preferably a power takeoff or a hydraulic supply from the transport device 4, however other forms of driver, such as an independent electric motor, are contemplated. The tool is preferably powered independent of the rotation of the traveler. However, in some instances independent power for the tool will not be required, such as where mere scraping of the ground effected by the rotation of the tool on the traveler is desired.

A variety of landscape tools are contemplated, including tillers, mowers, edgers and the like.

Thus, it is apparent that there has been provided in accordance with the invention an improved apparatus for landscaping around obstacles that fully satisfies the objections and advantages set for the above.

While the invention has been described in conjunction with illustrated embodiments thereof, it is evident that many alternatives, modifications and variations will be apparent to those skilled in the art in light of the foregoing description. Accordingly, it is intended to embrace all such alternatives, modifications and variations as fall within the spirit and broad scope of invention.

I claim:

1. An apparatus suitable for conveying and operating a landscaping tool around an obstacle in association with a driver, said apparatus comprising:

a frame adapted to be operably coupled to a transport device, a traveler, an open-centered support having a gap therein, said support being secured to said frame and being adapted to slidably engage said traveler, an engager adapted to operatively connect said traveler to a driver permitting the driver to cause said traveler to slide along said support, and a laterally adjustable tool attachment bracket secured to said traveler, said tool attachment bracket including sensing means for automatically adjusting the degree of lateral extension thereof, such that a landscape tool operably coupled to said tool attachment bracket maintains a coincident path about the obstacle, wherein in operation, said apparatus is presented to the obstacle such that the obstacle passes through the gap into the open center of said support, whereupon the engager engages the driver and said traveler slides along said support, such that the tool moves around the obstacle.

2. The apparatus of claim 1 wherein said engager operatively engages said traveler at least two points, two of the points being separated by a distance at least equal to the difference between the length of said support and the length of said traveler.

3. The apparatus of claim 1 wherein the driver is a power take off.

4. The apparatus of claim 1 wherein the driver is a hydraulic supply.

5. The apparatus of claim 1 wherein the traveler is rigid.

6. The apparatus of claim 1 wherein the engager comprises a gear adapted to urge said traveler along the support.

7. The apparatus of claim 1 further including wheels secured to said traveler and adapted to facilitate movement of said traveler along said support.

8. The apparatus of claim 1 wherein the support is constructed to permit the obstacle to be located substantially at an axis of rotation of said traveler.

9. The apparatus of claim 1 wherein the support further includes parking legs.

10. The apparatus of claim 1 wherein the support further includes a gate.

11. The apparatus of claim 1 wherein the attachment bracket includes a manual adjustment mechanism.

12. The apparatus of claim 1 wherein said sensing means includes a biased adjustment mechanism, wherein contact at a distal end of said attachment bracket acts to proximally and laterally displace said attachment bracket against a bias force.

13. The apparatus of claim 12 wherein the bias force is developed by a spring.

14. The apparatus of claim 1 wherein the attachment bracket is configured to permit selective pivoting of the tool.

15. The apparatus of claim 1 wherein said support is penannular.

16. The apparatus of claim 1 further including a guard disposed at said distal end of said attachment bracket.

17. The apparatus of claim 1 wherein the tool is a tiller.

18. The apparatus of claim 1 wherein the tool is a mower.

19. The apparatus of claim 1 wherein the tool is independently powered.

20. The apparatus of claim 1 wherein the transport device is a tractor.

21. The apparatus of claim 1 wherein the transport device is a utility vehicle.

22. Method of using a landscape tool around an obstacle comprising the steps of:

(a) obtaining an apparatus comprising a frame adapted to be operably coupled to a transport device; a traveler; an open-centered support, said support being adapted to slidably engage said traveler; an engager adapted to operatively connect said traveler to a driver permitting the driver to cause the traveler to slide along said support; and a laterally adjustable tool attachment braket secured to the traveler, said tool attachment bracket including sensing means for automatically adjusting the degree of lateral extension thereof, such that a landscape tool operably coupled to said tool attachment bracket maintains a coincident path about the obstacle;

(b) securing the tool to the bracket;

(c) presenting the apparatus to the obstacle such that the obstacle passes through the gap into the open center of the support and the tool is in a desired position;

(d) activating the driver; and (e) operatively connecting the traveler to the driver thereby causing the traveler to slide along the support such that the tool moves around the obstacle.

* * * * *